*US010906587B2*

United States Patent
Morisawa et al.

(10) Patent No.: US 10,906,587 B2
(45) Date of Patent: Feb. 2, 2021

(54) VEHICLE BODY FRONT STRUCTURE

(71) Applicant: HONDA MOTOR CO., LTD., Tokyo (JP)

(72) Inventors: Takuya Morisawa, Wako (JP); Toshimitsu Nishikuma, Wako (JP); Masayasu Yoshida, Wako (JP); Kenyu Okamura, Wako (JP); Kohji Imuta, Wako (JP); Fumihiro Osawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 16/453,034

(22) Filed: Jun. 26, 2019

(65) Prior Publication Data

US 2020/0001930 A1     Jan. 2, 2020

(30) Foreign Application Priority Data

Jun. 27, 2018    (JP) .................................. 2018-122413

(51) Int. Cl.
| | |
|---|---|
| *B60J 7/00* | (2006.01) |
| *B62D 21/15* | (2006.01) |
| *B60R 19/02* | (2006.01) |
| *B60R 19/34* | (2006.01) |
| *B62D 25/08* | (2006.01) |
| *B60R 19/24* | (2006.01) |

(52) U.S. Cl.
CPC .......... *B62D 21/155* (2013.01); *B60R 19/023* (2013.01); *B60R 19/34* (2013.01); *B62D 25/082* (2013.01); *B60R 2019/247* (2013.01); *B60Y 2306/01* (2013.01)

(58) Field of Classification Search
CPC ....... A63H 17/26; B60F 1/005; B60G 17/019; B60G 2300/26; B60G 5/047; A61M 5/14546; A61M 5/14566; B41J 11/003; B41J 11/008; B41J 11/42
See application file for complete search history.

(56) References Cited

U.S. PATENT DOCUMENTS

| | | | | |
|---|---|---|---|---|
| 6,299,227 | B1 * | 10/2001 | Kroning ................. | B60R 19/26 293/132 |
| 7,077,439 | B2 * | 7/2006 | White .................. | B21D 26/055 293/120 |

(Continued)

FOREIGN PATENT DOCUMENTS

| | | |
|---|---|---|
| JP | 2015-104972 A | 6/2015 |
| JP | 6004089 B2 | 10/2016 |
| JP | 2018-083512 A | 5/2018 |

OTHER PUBLICATIONS

Japanese Office Action received in corresponding JP application No. 2018-122413 with English Translation dated Oct. 4, 2019 (8 pages).

*Primary Examiner* — Kiran B Patel
(74) *Attorney, Agent, or Firm* — Rankin, Hill & Clark LLP

(57) ABSTRACT

A vehicle body front structure includes a front sub-frame configured such that a gear box is fitted to a front part of the front sub-frame, an arm portion extending from a front part of the front sub-frame forward and outward in a vehicle width direction, an impact absorbing portion supported by the arm portion, and a horn portion arranged on a front side of the impact absorbing portion.

10 Claims, 7 Drawing Sheets

(56) References Cited

U.S. PATENT DOCUMENTS

| | | | |
|---|---|---|---|
| 8,967,701 B2* | 3/2015 | Barbat | B62D 21/152 296/187.1 |
| RE47,286 E * | 3/2019 | Ohnaka | B62D 25/085 |
| 2008/0224502 A1* | 9/2008 | Miki | B62D 25/2018 296/203.02 |
| 2010/0259033 A1* | 10/2010 | Okabe | B60R 21/0136 280/734 |
| 2012/0187720 A1* | 7/2012 | Tomozawa | B62D 25/082 296/187.09 |
| 2012/0228890 A1* | 9/2012 | Frank | B60R 19/34 293/155 |
| 2013/0207417 A1* | 8/2013 | Kihara | B62D 21/152 296/187.09 |
| 2013/0249243 A1* | 9/2013 | Lee | B62D 25/082 296/187.03 |
| 2013/0256051 A1* | 10/2013 | Nakamura | B62D 21/155 180/271 |
| 2014/0361561 A1* | 12/2014 | Kuriyama | B62D 25/082 293/133 |
| 2015/0021115 A1* | 1/2015 | Komiya | B62D 21/11 180/312 |
| 2015/0021956 A1* | 1/2015 | Courtright | B62D 25/082 296/203.03 |
| 2015/0151699 A1 | 6/2015 | Kaneko et al. | |
| 2015/0251613 A1* | 9/2015 | Mori | B62D 21/152 296/187.09 |
| 2015/0283901 A1* | 10/2015 | Bernardi | B60K 5/1275 180/232 |
| 2015/0298634 A1* | 10/2015 | Hara | B60R 19/24 293/133 |
| 2015/0314807 A1* | 11/2015 | Nusier | B62D 21/11 296/187.09 |
| 2015/0329144 A1* | 11/2015 | Hara | B60R 19/24 296/187.09 |
| 2015/0336525 A1* | 11/2015 | Nam | B60R 19/04 296/187.1 |
| 2016/0039374 A1* | 2/2016 | Sugano | B62D 25/08 293/133 |
| 2016/0046250 A1 | 2/2016 | Sotoyama | |
| 2016/0059810 A1* | 3/2016 | Watanabe | B62D 21/152 293/133 |
| 2016/0107695 A1* | 4/2016 | Lee | B62D 21/152 296/187.09 |
| 2016/0152201 A1* | 6/2016 | Ramoutar | B60R 19/24 296/187.1 |
| 2016/0176442 A1* | 6/2016 | Miyagano | B62D 25/08 296/193.09 |
| 2017/0088178 A1* | 3/2017 | Tsukada | B62D 25/025 |
| 2017/0088180 A1* | 3/2017 | Takeda | B62D 25/08 |
| 2017/0106909 A1* | 4/2017 | Daido | B60R 19/34 |
| 2017/0210316 A1* | 7/2017 | Duffe | B60R 19/04 |
| 2017/0217501 A1* | 8/2017 | Takeda | B62D 25/08 |
| 2017/0253272 A1* | 9/2017 | Sekiya | B62D 25/085 |
| 2017/0291642 A1* | 10/2017 | Nusier | B60R 19/023 |
| 2018/0178742 A1* | 6/2018 | Hojo | B60R 19/26 |
| 2018/0194399 A1* | 7/2018 | Grattan | B62D 21/05 |
| 2018/0257588 A1* | 9/2018 | Choi | F16F 7/128 |
| 2018/0265135 A1* | 9/2018 | Komiya | B62D 21/06 |
| 2018/0273094 A1* | 9/2018 | Komiya | B62D 7/163 |
| 2018/0281863 A1* | 10/2018 | Daikokuya | B62D 21/152 |
| 2018/0370569 A1* | 12/2018 | Madasamy | B60R 19/24 |
| 2019/0016389 A1* | 1/2019 | Kamei | B62D 21/152 |
| 2019/0054956 A1* | 2/2019 | Stenvall | B60R 19/18 |
| 2019/0144039 A1* | 5/2019 | Ahmed | B60R 19/34 296/187.1 |
| 2019/0161037 A1* | 5/2019 | Yoshida | B60R 19/18 |
| 2019/0168702 A1* | 6/2019 | Fujii | B60R 19/24 |
| 2019/0291668 A1* | 9/2019 | Sato | B60R 19/12 |
| 2019/0299889 A1* | 10/2019 | Wada | B60R 19/34 |
| 2019/0300059 A1* | 10/2019 | Komiya | B62D 21/11 |
| 2019/0315410 A1* | 10/2019 | Shinya | B62D 25/08 |
| 2019/0329824 A1* | 10/2019 | Grattan | B62D 25/082 |
| 2020/0047811 A1* | 2/2020 | Shimizu | B62D 25/082 |
| 2020/0086920 A1* | 3/2020 | Okamoto | B62D 21/11 |
| 2020/0101854 A1* | 4/2020 | Nakanishi | B62D 25/12 |
| 2020/0130495 A1* | 4/2020 | Shimizu | B62D 25/2036 |
| 2020/0324823 A1* | 10/2020 | Kawamura | B62D 21/08 |
| 2020/0353987 A1* | 11/2020 | Yoshida | B60R 19/023 |
| 2020/0353988 A1* | 11/2020 | Gardner | B62D 21/155 |

* cited by examiner

VEHICLE BODY FRONT STRUCTURE

BACKGROUND OF THE INVENTION

1. Field of the Invention

The present invention relates to a vehicle body front structure.

2. Description of the Related Art

In a vehicle body front structure for a vehicle, a pair of front side frames are arranged separately from each other on the right and left, and a front sub-frame is arranged between the pair of the front side frames (see Japanese Patent No. 6004089). Moreover, an engine serving as a drive source (or a motor and a high-voltage electric component in the case of an electric vehicle) and a gear box are fitted to the front sub-frame.

In this vehicle body front structure, the gear box may be fitted to a front part of the front sub-frame, and the motor and the high-voltage electric component may be fitted in this order behind the gear box from the viewpoint of steering stability of the vehicle.

In the following description, the front side frame may be abbreviated as a side frame while the front sub-frame may be abbreviated as a sub-frame.

SUMMARY OF THE INVENTION

However, according to the above-mentioned vehicle body front structure, strength of the gear box is relatively high and a front part of the sub-frame cannot absorb collision energy in case of a front collision of the vehicle, whereby a rear part of the sub-frame is deformed as a consequence.

Moreover, when an amount of deformation of the rear part of the sub-frame is large, the motor and the high-voltage electric component significantly move rearward. Then, the high-voltage electric component may be damaged by being caught between the motor moving from the front side and a framework component (such as a dashboard cross member) of a vehicle body arranged on the rear side. Meanwhile, in the case where a component fitted to the rear part of the sub-frame is the engine, the engine may deform the dashboard door panel into a vehicle cabin.

The present invention has been made in view of the aforementioned circumstances, and an object thereof is to provide a vehicle body front structure which is capable of reducing an amount of deformation of a rear part of a front sub-frame in case of a front collision.

To attain the object, a vehicle body front structure according to the present invention includes a front sub-frame configured such that a gear box is fitted to a front part of the front sub-frame, an arm portion extending from a front part of the front sub-frame forward and outward in a vehicle width direction, an impact absorbing portion supported by the arm portion, and a horn portion arranged on a front side of the impact absorbing portion.

According to the vehicle body front structure of the present invention, an amount of deformation of a rear part of the front sub-frame is reduced in case of a front collision.

DETAILED DESCRIPTION OF THE EMBODIMENTS

Next, a vehicle EV applying a vehicle body front structure according to an embodiment will be described with reference to the drawings. Note that the vehicle EV to be described in this embodiment is an electric vehicle which mounts a gear box M1, a motor M2, and a high-voltage electric component M3 (see FIG. 2) in a motor room MR located at a vehicle body front part.

Figure 1:
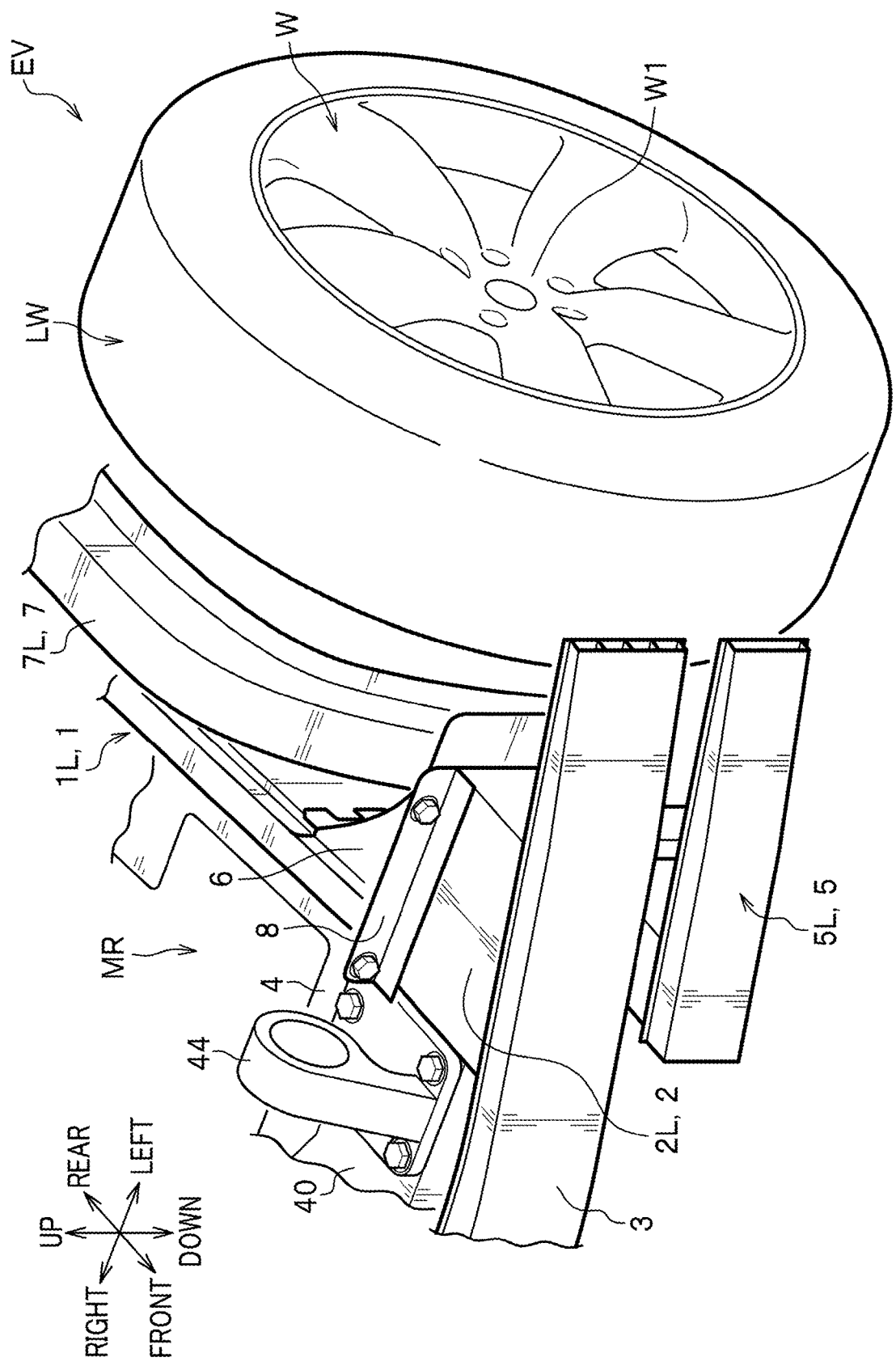
FIG. 1 is a perspective view of a left half of a vehicle body front part of an embodiment, which is viewed from above on a front left side.

As shown in FIG. 1, the vehicle EV includes the following elements as components constituting a framework of the vehicle body front part, namely, a pair of side frames 1, a pair of crash cans 2 each of which is arranged on a front side of the corresponding side frame 1, a bumper beam 3 which is arranged on a front side of the pair of crash cans 2 and extends in a vehicle width direction, a sub-frame 4 arranged between the pair of side frames 1, a pair of sub-bumpers 5 arranged below the bumper beam 3, and a pair of upper members 7 arranged on outer sides in the vehicle width direction of the pair of side frames 1.

Note that the vehicle body front structure of this embodiment is formed into a bilaterally symmetric structure based on a center line O1 (see FIG. 2) in the vehicle width direction. Therefore, regarding the paired components (the pair of side frames 1, the pair of crash cans 2, the pair of sub-bumpers 5, and the pair of upper members 7), the components on the left side (a left side frame 1L, a left crash can 2L, a left sub-bumper 5L, and a left upper member 7L) will be described while omitting a description of the components on the right side (a right side frame, a right crash can, a right sub-bumper, and a right upper member).

Figure 2:
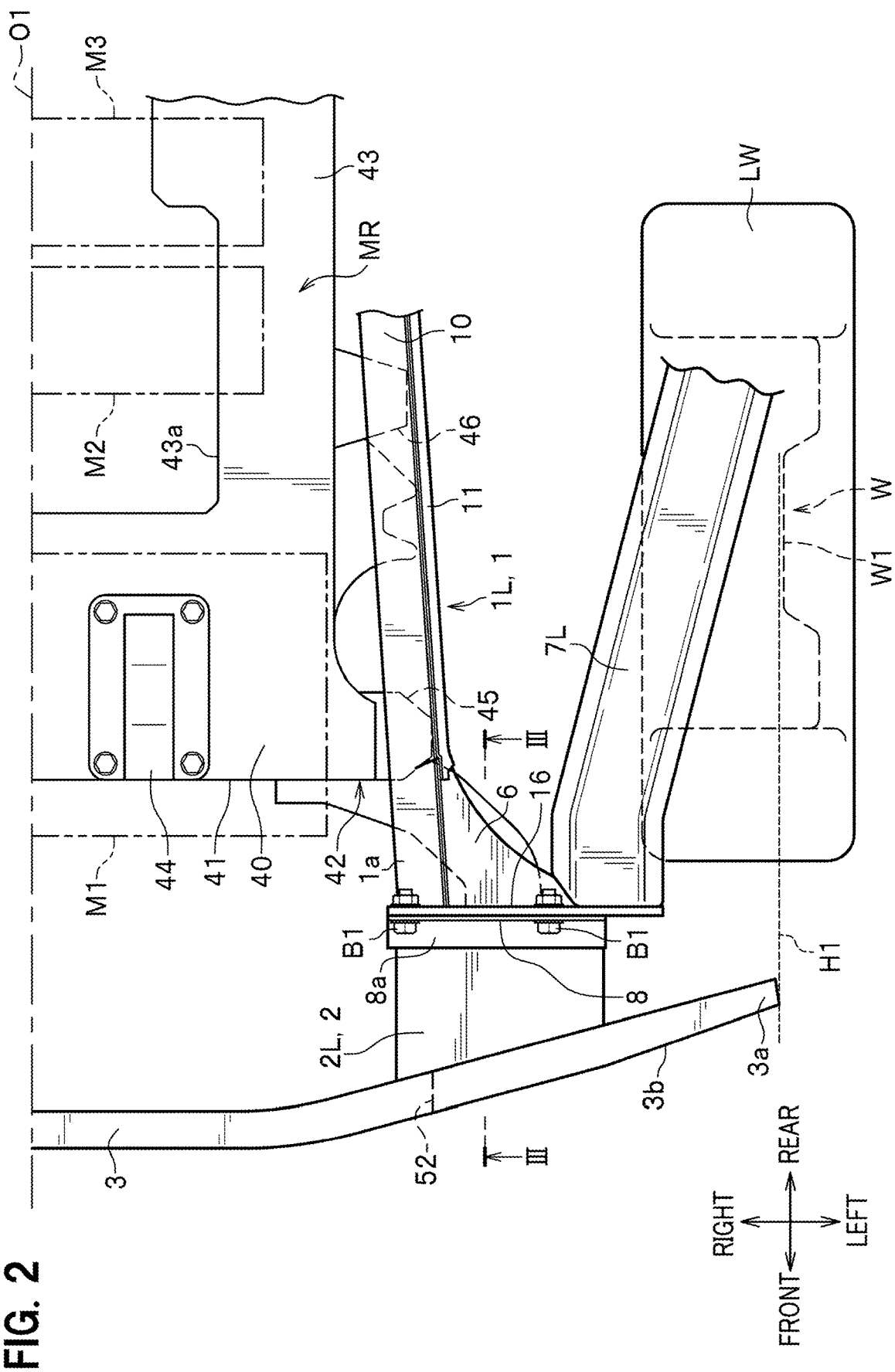
FIG. 2 is a plan view of the vehicle body front part of FIG. 1.

As shown in FIG. 2, the left side frame 1L is a component that extends in a front-rear direction. The left side frame 1L is arranged on an outer side in the vehicle width direction away from the center line O1, and a motor room MR is formed on an inner side in the vehicle width direction of the left side frame 1L.

The left side frame 1L is formed by joining a first frame 10 having a substantially C-shaped cross-section being open outward in the vehicle width direction to a second frame 11 having a plate shape that closes the opening of the first frame 10. In other words, the left side frame 1L takes on a quadrangular cylindrical cross-sectional shape and includes four walls, namely, an upper wall, a lower wall, a left wall (an outer wall in the vehicle width direction), and a right wall (an inner wall in the vehicle width direction).

Figure 3:
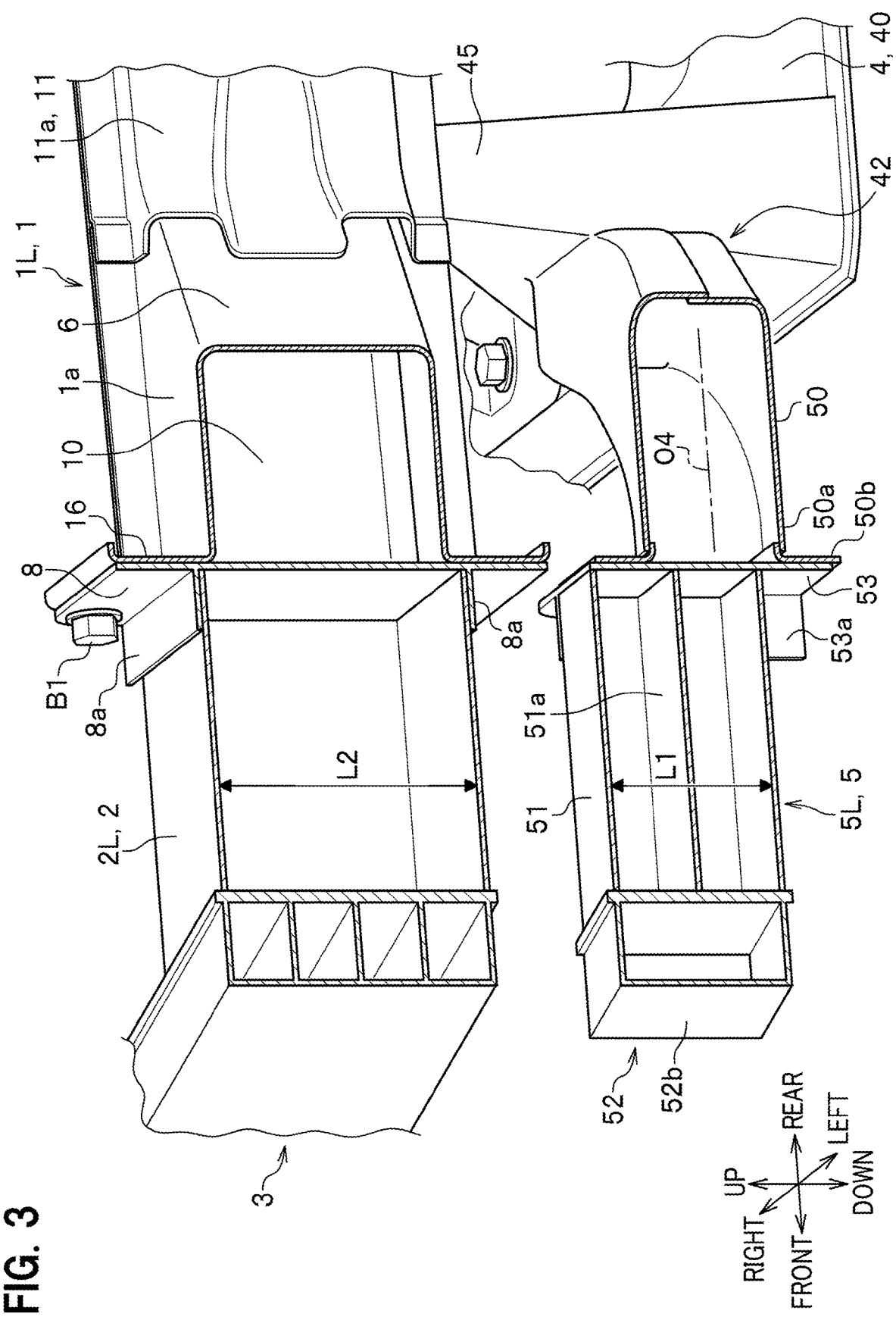
FIG. 3 is a perspective view of a cross-section taken along the III-III line in FIG. 2, which is viewed from above on the front left side.
Figure 4:
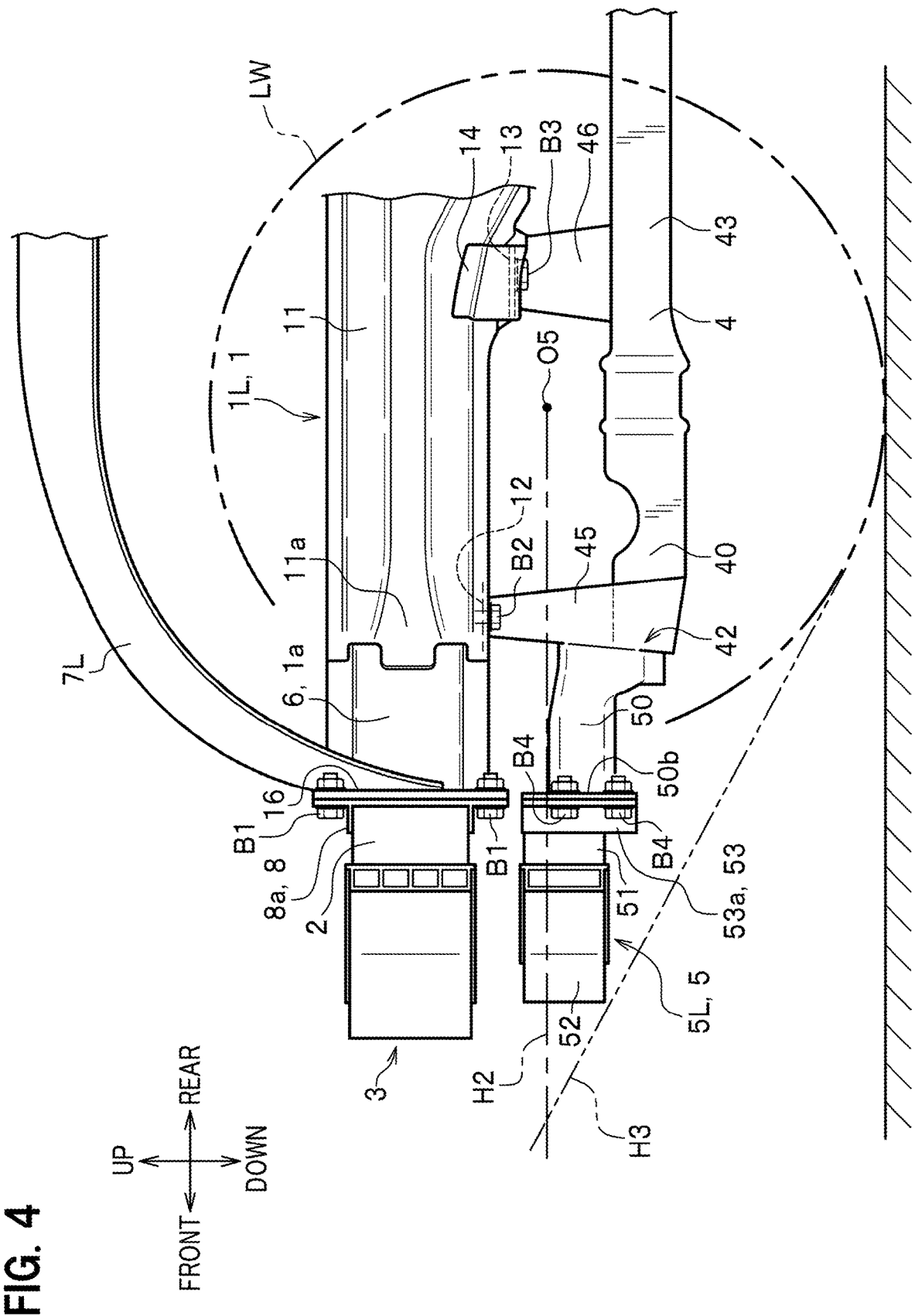
FIG. 4 is a left side view of the vehicle body front part of FIG. 1, which is viewed from a left side.

As shown in FIGS. 3 and 4, instead of the second frame 11, a gusset 6 is used as a left wall of a front part 1a of the left side frame 1L.

The gusset 6 is a reinforcing plate which is formed into a substantially triangular shape in plan view (see FIG. 2). As a consequence, the left wall of the front part 1a of the left side frame 1L bulges to the left side. Moreover, the left wall (a left end of the gusset 6) of the front part 1a of the left side frame 1L is joined to a front end of the left upper member 7L.

Meanwhile, although it is not specifically illustrated, a rear end of the gusset 6 is inserted into a front end part 11a of the second frame 11 arranged at the rear. For this reason, the front end part 11a of the second frame 11 and its surrounding part are reinforced by the gusset 6.

As shown in FIG. 4, a reinforcing plate 14 is joined to the left wall at an intermediate part in the front-rear direction of the left side frame 1L.

A portion of the lower wall of the left side frame 1L constitutes fixation walls (a front fixation wall 12 and a rear fixation wall 13) to which a front leg portion 45 and a rear leg portion 46 of the sub-frame 4 to be described later are fixed.

The front fixation wall 12 is located below the front end part 11a of the second frame 11 in side view and is reinforced by the gusset 6. Meanwhile, the rear fixation wall 13 is located below the reinforcing plate 14 in side view and is reinforced by the reinforcing plate 14.

Here, the left side frame 1L includes the gusset 6 and the reinforcing plate 14, and is thus configured to absorb collision energy in case of a front collision by means of a deformation of a section other than the portions reinforced by the gusset 6 and the reinforcing plate 14.

As shown in FIGS. 2 and 3, the left crash can 2L is an impact absorbing component having a quadrangular cylindrical shape that is open in the front-rear direction, and a front end thereof is joined to a rear surface of the bumper beam 3. Accordingly, when a collision load is inputted to the bumper beam 3 due to a front collision, the left crash can 2L is deformed in such a way as to reduce its length in the front-rear direction and the collision energy to be transmitted to the left side frame 1L is thus diminished.

A supporting plate 8 that extends in the vehicle width direction and in an up-down direction is joined to a rear end of the left crash can 2L.

As shown in FIG. 3, the supporting plate 8 is fastened to a flange 16, which projects outward from a front end of the left side frame 1L (inclusive of the gusset 6), by using fasteners B1. Thus, the supporting plate 8 is supported attachably to and detachably from the left side frame 1L.

Meanwhile, a pair of projections 8a projecting forward for sandwiching the rear end of the left crash can 2L from upper and lower sides are provided on a front surface of the supporting plate 8. This pair of projections 8a increase the junction area with the left crash can 2L, thereby increasing bonding strength.

As shown in FIG. 2, the bumper beam 3 is curved in such a way as to be bent rearward as the bumper beam 3 extends outward in the vehicle width direction. An attachment surface W1 of an alloy wheel W for a left front wheel LW is located behind a left end part 3a of the bumper beam 3 (see a dashed line H1 in FIG. 2).

Here, the attachment surface W1 is a region to attach an axle side hub that is formed on a tip side of an axle. The attachment surface W1 of this embodiment is offset outward in the vehicle width direction from the center in the vehicle width direction of the alloy wheel W.

The sub-frame 4 is a horizontal plate constituting a lower wall of the motor room MR, which supports the gear box M1, the motor M2, and the high-voltage electric component M3 from below.

To be more precise, a front part 40 of the sub-frame 4 takes on a substantially quadrangular shape in plan view. On the other hand, a rear part 43 of the sub-frame 4 is provided with a maintenance opening 43a at a central part in a right-left direction, thus taking on a U-shape that is open rearward.

A front end 41 of the front part 40 extends straight in the right-left direction, and substantially right-angled corner parts 42 are formed at two ends of the front end 41.

A front side attachment part 44 that projects upward is provided on an upper surface of the front part 40 of the sub-frame 4. Moreover, the gear box M1 is fastened to the front side attachment part 44 with a not-illustrated fastener.

Meanwhile, a rear side attachment part (not shown) is provided to the rear part 43 of the sub-frame 4, and the motor M2 and the high-voltage electric component M3 are attached to this rear side attachment part.

In this way, the gear box M1 is fitted to the front part 40 of the sub-frame 4, while the motor M2 and the high-voltage electric component M3 are fitted in this order to the rear part 43 thereof.

In addition, a not-illustrated grill is installed at the front end 41 of the sub-frame 4 so as to cause drive airflow to blow against the gear box M1 and so forth during the driving.

Figure 5:
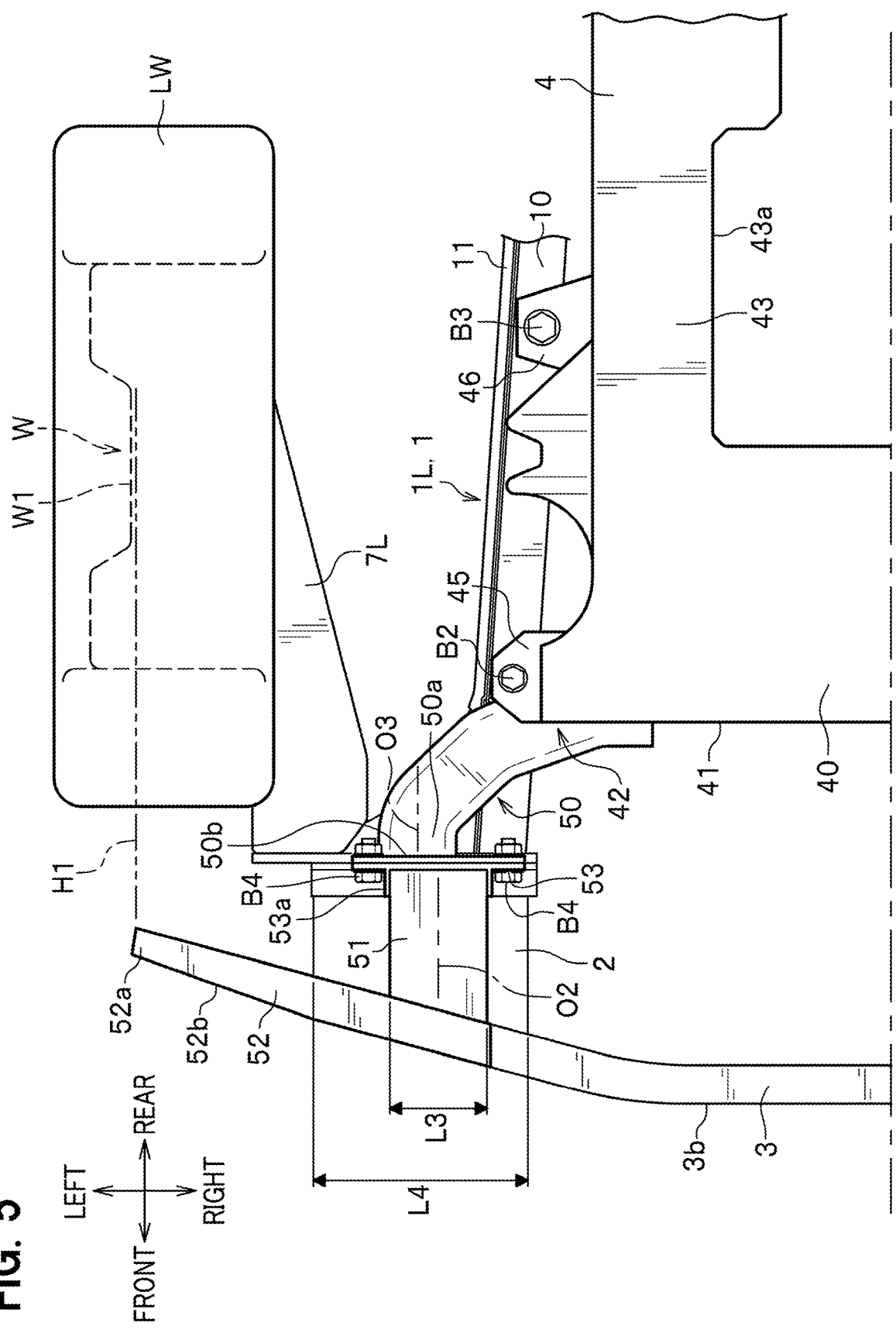
FIG. 5 is a bottom view of the vehicle body front part of FIG. 1, which is viewed from below.

As shown in FIGS. 4 and 5, a pair of front leg portions 45 and a pair of rear leg portions 46 extending upward are formed on right and left side surfaces of the sub-frame 4.

As shown in FIG. 4, an upper end of each front leg portion 45 is fastened to the front fixation wall 12 of the sub-frame 4 by using a fastener B2. Meanwhile, an upper end of each rear leg portion 46 is fastened to the rear fixation wall 13 of the sub-frame 4 by using a fastener B3. Thus, the sub-frame 4 is arranged between the pair of side frames 1 and located below the pair of side frames 1 and the bumper beam 3.

Meanwhile, as shown in FIGS. 3 and 5, the front leg portion 45 is provided on an outer side in the vehicle width direction of the corner part 42 of the sub-frame 4. Thus, strength of the corner part 42 is increased.

The left sub-bumper 5L is a bumper member which extends forward from the front part 40 of the sub-frame 4 and is arranged below the bumper beam 3 for absorbing the collision energy in case of a front collision.

As shown in FIG. 5, the left sub-bumper 5L includes an arm portion 50 that extends from the front part 40 of the sub-frame 4 forward and outward in the vehicle width direction, a cylindrical impact absorbing portion 51 supported by the arm portion 50, and a horn portion 52 fixed to a front end of the impact absorbing portion 51.

As shown in FIG. 3, the arm portion 50 takes on a cross-sectional shape of a substantially quadrangular cylinder, in which a front end 50a is provided with a flange 50b that bulges outward.

As shown in FIG. 4, a rear part (a base part) of the arm portion 50 is joined to the front part 40 of the sub-frame 4, and extends in a substantially horizontal direction. Moreover, the rear part (the base part) of the arm portion 50 of this embodiment is connected (joined) to both of the corner part 42 and the front leg portion 45. As a consequence, the arm portion 50 is supported by the corner part 42 and the front leg portion 45 and is located upward as compared to the case where the arm portion 50 is supported by the corner part 42 only.

As shown in FIG. 5, the arm portion 50 is bent in such a way that the arm portion 50 is directed gradually forward from a rear end to the front end 50a, and the front end 50a (a tip) is directed forward. In short, the arm portion 50 is curved from the rear end to the front end 50a.

As shown in FIG. 3, the impact absorbing portion 51 is a component having a quadrangular cylindrical shape, which extends in the front-rear direction.

A length L1 in the up-down direction of the impact absorbing portion 51 is smaller than a length L2 in the up-down direction of the left crash can 2L. Moreover, as shown in FIG. 5, a length L3 in the right-left direction of the impact absorbing portion 51 is smaller than a length L4 in the right-left direction of the left crash can 2L. As a consequence, the closed cross-sectional area of the impact absorbing portion 51 is smaller than the closed cross-sectional area of the left crash can 2L and the impact absorbing portion 51 is reduced in size as compared to the left crash can 2L.

As shown in FIG. 3, a rib 51a extending in the horizontal direction at the intermediate part in the up-down direction is formed inside the impact absorbing portion 51. As a consequence, though the impact absorbing portion 51 is reduced in size as compared to the left crash can 2L, the impact absorbing portion 51 is designed to have almost the same strength as the left crash can 2L.

A base plate 53 extending in the right-left direction and in the up-down direction is joined to a rear end of the impact absorbing portion 51. Moreover, the base plate 53 is attachably and detachably fastened to the flange 50b of the arm portion 50 by using a fastener B4 (illustrated only in FIG. 4).

Meanwhile, a pair of projections 53a projecting forward for sandwiching the rear end of the impact absorbing portion 51 from right and left sides are provided on a front surface of the base plate 53. This pair of projection 53a increase the junction area with the impact absorbing portion 51, thereby increasing bonding strength.

As shown in FIG. 5, a center O2 in the vehicle width direction of the impact absorbing portion 51 is located on an inner side in the vehicle width direction relative to a center O3 in the vehicle width direction of the front end 50a of the arm portion 50. In other words, the impact absorbing portion 51 is offset inward in the vehicle width direction from the arm portion 50.

As shown in FIG. 3, the center in the up-down direction of the impact absorbing portion 51 (see the rib 51a formed at the intermediate part in the up-down direction) is located on an upper side relative to a center O4 in the up-down direction of the front end 50a of the arm portion 50. In other words, the impact absorbing portion 51 is offset upward from the arm portion 50.

The horn portion 52 is a hollow component which extends in the right-left direction and has a small thickness in the front-rear direction.

As shown in FIG. 5, the horn portion 52 covers a front opening of the impact absorbing portion 51 and extends outward in the vehicle width direction. As a consequence, the impact absorbing portion 51 and the corner part 42 take on an L-shape in plan view.

The alloy wheel W for the left front wheel LW is arranged behind an outer end 52a in the vehicle width direction of the horn portion 52. In the meantime, the outer end 52a is located in the vehicle width direction of the horn portion 52 is located substantially at the same position in the vehicle width direction as the attachment surface W1 that is offset outward in the vehicle width direction.

The horn portion 52 is curved in such a way as to be bent rearward as the horn portion 52 extends outward in the vehicle width direction along with the bumper beam 3. For this reason, a front surface 52b of the horn portion 52 and a front surface 3b of the bumper beam 3 overlap each other when the horn portion 52 and the bumper beam 3 are viewed in the up-down direction (see FIGS. 2 and 5).

As shown in FIG. 4, the horn portion 52 is located at the same height as a rotation center O5 of the left front wheel LW (see a chain line H2 in FIG. 4). Meanwhile, the horn portion 52 is set at a predetermined approach angle (see a chain double-dashed line H3 in FIG. 4) such that the horn portion 52 is kept from coming into contact with an inclined uphill road surface when the vehicle EV runs on the inclined road surface.

Next, a description will be given of the operation and effect of this embodiment.

The vehicle body front structure of this embodiment includes: the front sub-frame 4 in which the gear box M1 is fitted to the front part 40 of the front sub-frame 4; the arm portion 50 that extends from the front part 40 of the front sub-frame 4 forward and outward in the vehicle width direction; the impact absorbing portion 51 supported by the arm portion 50; and the horn portion 52 arranged on the front side of the impact absorbing portion 51.

Figure 6:
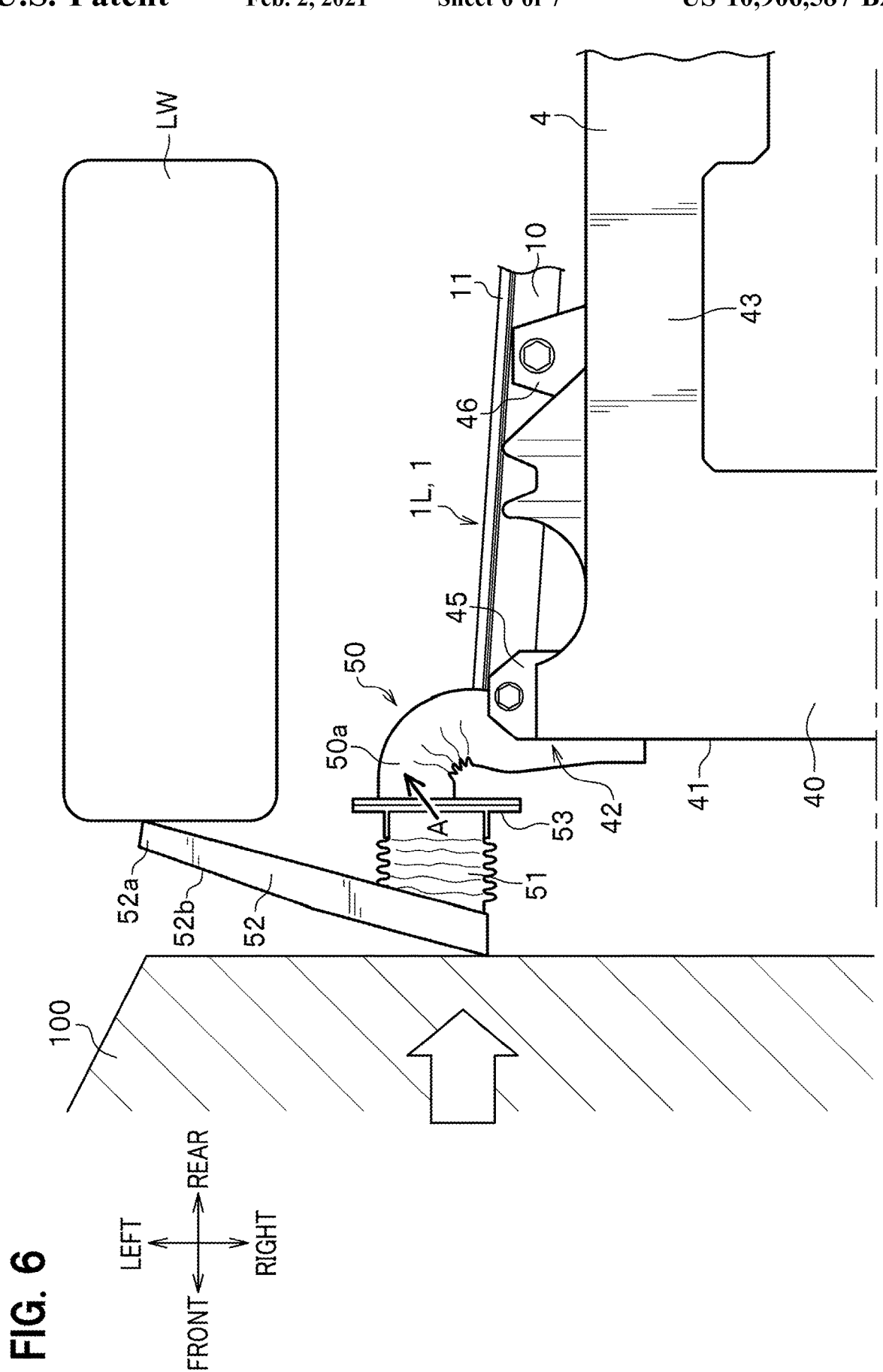
FIG. 6 is a plan view of the vehicle body front part in a state of a front collision.

Accordingly, when the vehicle EV collides with an object in front such as a concrete wall 100 and the collision load is inputted to the horn portion 52, the impact absorbing portion 51 is compressed in the front-rear direction and the arm portion 50 is bent from the base part (the rear part) as shown in FIG. 6 (see an arrow A).

In this way, the collision energy is absorbed by the sub-bumper 5 at an initial stage of the collision whereby the collision energy to be transmitted to the front sub-frame 4 is reduced. Accordingly, an amount of deformation of the rear part 43 of the front sub-frame 4 is reduced and the high-voltage electric component M3 is less likely to be caught between the motor M2 and a framework component of the vehicle body.

Meanwhile, in the vehicle body front structure of this embodiment, the horn portion 52 projects outward in the vehicle width direction from the impact absorbing portion 51, and the horn portion 52 and the impact absorbing portion 51 take on the L-shape in plan view.

As a consequence, the contact area of the horn portion 52 with the opponent vehicle in case of a front collision is increased whereby the load acting on the opponent vehicle is not concentrated but is dispersed instead. Thus, the vehicle body front structure has low aggression toward the opponent vehicle.

Moreover, since the horn portion 52 extends outward in the vehicle width direction, the horn portion 52 does not cover a front part of the grill (not shown). Accordingly, the horn portion 52 does not reduce an amount of air introduction into the motor room MR during the driving.

Figure 7A:
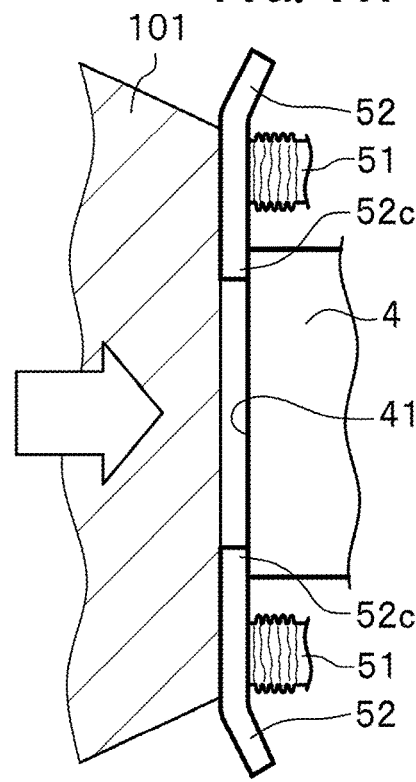
FIG. 7A is a schematic diagram schematically showing a state of a front collision of the vehicle body front part provided with a horn portion that extends inward in a vehicle width direction.

Furthermore, since the horn portion 52 extends outward in the vehicle width direction, amounts of deformation (amounts of impact absorption) of the arm portion 50 and the impact absorbing portion 51 are not decreased. To be more precise, if the horn portion 52 extends inward in the vehicle width direction as shown in FIG. 7A, an inner end 52c of the horn portion 52 may be interposed between an opponent vehicle 101 and the front end 41 of the front sub-frame 4.

Figure 7B:
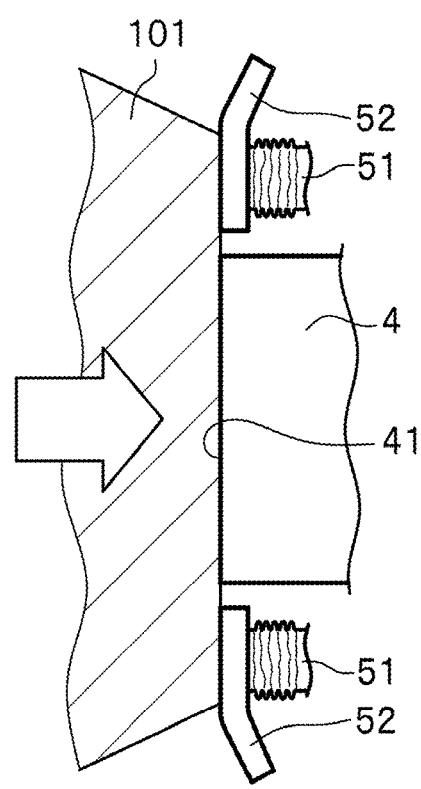
FIG. 7B is a schematic diagram schematically showing a state of a front collision of the vehicle body front part provided with a horn portion that extends outward in the vehicle width direction.

On the other hand, according to this embodiment, the horn portion 52 is not interposed between the opponent vehicle 101 and the front sub-frame 4 as shown in FIG. 7B. Hence, the amounts of deformation of the arm portion 50 and the impact absorbing portion 51 are increased whereby a capacity to absorb the collision energy is increased.

Meanwhile, in the vehicle body front structure of the embodiment, the outer end 52a in the vehicle width direction of the horn portion 52 and the attachment surface W1 of the alloy wheel W are located substantially at the same position in the vehicle width direction.

As shown in FIG. 6, when the horn portion 52 backs off due to the front collision, the outer end 52a of the horn portion 52 comes into contact with the left front wheel LW and the collision energy is inputted to the attachment surface W1. Moreover, as describer earlier, the collision energy to be inputted to the attachment surface W1 is large since the outer end 52a and the attachment surface W1 are located substantially at the same position in the vehicle width direction. As a consequence, more collision energy is dispersed to not-illustrated arms and the like that support the left front wheel LW, whereby the amount of deformation of the rear part 43 of the front sub-frame 4 is further reduced.

Meanwhile, in the vehicle body front structure of the embodiment, the horn portion 52 is arranged below the bumper beam 3. Moreover, the front surface 52b of the horn portion 52 is formed into the same shape as the front surface 3b of the bumper beam 3, and the front surface 52b and the front surface 3b overlap each other in plan view.

According to the above-described configuration, the bumper beam 3 and the horn portion 52 come into contact with the colliding opponent vehicle at the same time in case of a front collision and the load acting on the opponent vehicle is thus dispersed. As a consequence, the aggression toward the opponent vehicle is reduced.

Meanwhile, in the vehicle body front structure of the embodiment, the rear end of the arm portion 50 is connected to the corner part 42 of the front part 40 of the front sub-frame 4.

According to the above-described configuration, the arm portion 50 is supported by the corner part 42 that has high strength in the front sub-frame 4. As a consequence, the arm portion 50 is reliably deformed to absorb the collision energy in case of a front collision.

Meanwhile, in the vehicle body front structure of the embodiment, the front sub-frame 4 is provided with the front leg portion 45 that extends from the corner part 42 and is connected to the front side frame 1, and the rear end of the arm portion 50 is connected to both of the corner part 42 and the front leg portion 45.

Accordingly, the left sub-bumper 5L (the arm portion 50, the impact absorbing portion 51, and the horn portion 52) is located upward as compared to the case where the arm portion 50 is connected only to the front side frame 1.

In the meantime, the impact absorbing portion 51 of this embodiment is offset upward from the arm portion 50.

In this way, it is possible to provide the horn portion 52 with the predetermined approach angle (see the chain double-dashed line H3 in FIG. 4), and to set the horn portion 52 at such a height (see the chain line H2 in FIG. 4) that the outer end 52a thereof comes into contact with the left front wheel LW in case of a front collision.

Meanwhile, in the vehicle body front structure of the embodiment, the front side frame 1 is reinforced by the gusset 6 and the front leg portion 45 is connected to the region (the front fixation wall 12) of the front side frame 1 reinforced by the gusset 6.

In other words, the front leg portion 45 is connected to a portion (a reinforced portion) in the front side frame 1 which is not supposed to be deformed in case of a front collision.

Accordingly, the front leg portion 45 is kept from blocking the deformation of the left side frame 1L in case of a front collision.

Meanwhile, in the vehicle body front structure of the embodiment, the center O2 in the vehicle width direction of the impact absorbing portion 51 is located on the inner side in the vehicle width direction as compared to the center O3 in the vehicle width direction of the front end 50a of the arm portion 50.

According to this configuration, the arm portion 50 is less likely to be deformed than in the case where the center O2 in the vehicle width direction of the impact absorbing portion 51 and the center O3 in the vehicle width direction of the arm portion 50 are aligned with each other in the vehicle width direction. For this reason, in case of a minor collision that generates small collision energy, only the impact absorbing portion 51 is deformed without causing the deformation of the arm portion 50. Moreover, when only the impact absorbing portion 51 is deformed, it is possible to loosen the fastener B4 to detach the impact absorbing portion 51 and the horn portion 52, and to replace the impact absorbing portion 51 and the horn portion 52 with new components, respectively. As described above, it is possible to reduce the number of components to be replaced and thus to achieve cost reduction.

Meanwhile, in the vehicle body front structure of the embodiment, the impact absorbing portion 51 takes on the cylindrical shape and includes the rib 51a inside.

According to the above-described configuration, the impact absorbing portion 51 can be reduced in size while retaining the strength equivalent to that of the crash cans 2. In this way, it is possible to secure installation spaces for other components (such as lamps) around the sub-bumpers 5.

Moreover, since the strength of the impact absorbing portion 51 is equivalent to the strength of the crash cans 2, a load originating from the contact with the bumper beam 3 and a load originating from the contact with the horn portion 52, which act on the opponent vehicle, are evenly dispersed whereby the aggression toward the opponent vehicle is further reduced in case of a front collision.

Meanwhile, in the vehicle body front structure of the embodiment, the arm portion 50 is curved from the front end 50a to the rear end.

The above-described configuration can increase the strength against the front collision more than an arm portion which is substantially L-shaped in plan view, for instance. As a consequence, the vehicle body front structure has a high collision energy absorption capacity and absorbs a large amount of the collision energy at an initial stage of a collision. Thus, the collision energy to be transmitted to the front sub-frame 4 is significantly reduced.

Moreover, since only the impact absorbing portion 51 is deformed in the case of the minor collision, it is not necessary to replace the arm portion 50 (the front sub-frame 4) in that case.

While the embodiment has been described above, the vehicle body front structure of the present invention may also be applied to a vehicle in which the gear box M1 is fitted to a front part of the front sub-frame 4 and the engine is fitted to a rear part thereof. When the vehicle body front structure is applied to the aforementioned vehicle, the vehicle body front structure can inhibit the engine from moving significantly rearward in case of a front collision, thereby preventing the engine from deforming a dashboard lower panel toward the vehicle cabin.

Meanwhile, regarding the shape of the arm portion 50, the arm portion may be formed into an L-shape in plan view. After all, the arm portion 50 is not limited to a particular shape as long as the arm portion 50 is deformable in case of a front collision.

Alternatively, the arm portion 50 may be connected only to the corner part 42 or only to the front leg portion 45.

In the meantime, besides the horn portion 52 that extends outward in the vehicle width direction based on the impact absorbing portion 51, the horn portion of the present invention may be a horn portion that extends inward in the vehicle width direction only or a horn portion that extends inward and outward in the vehicle width direction.

What is claimed is:

1. A vehicle body front structure comprising:
    a front sub-frame configured such that a gear box is fitted to a front part of the front sub-frame;
    an arm portion extending from a front part of the front sub-frame forward and outward in a vehicle width direction;
    an impact absorbing portion supported by the arm portion; and
    a horn portion arranged on a front side of the impact absorbing portion.

2. The vehicle body front structure according to claim 1, wherein
    the horn portion projects outward in the vehicle width direction from the impact absorbing portion, and
    the horn portion and the impact absorbing portion take on an L-shape in plan view.

3. The vehicle body front structure according to claim 2, wherein an outer end in the vehicle width direction of the horn portion and an attachment surface of an alloy wheel are located substantially at the same position in the vehicle width direction.

4. The vehicle body front structure according to claim 1, wherein
    the horn portion is arranged below a bumper beam, and
    a front surface of the horn portion is formed into the same shape as a front surface of the bumper beam and the front surfaces overlap each other in plan view.

5. The vehicle body front structure according to claim 1, wherein a rear end of the arm portion is connected to a corner part of the front part of the front sub-frame.

6. The vehicle body front structure according to claim 5, wherein
    the front sub-frame includes a front leg portion extending from the corner part and being connected to a front side frame, and
    the rear end of the arm portion is connected to both of the corner part and the front leg portion.

7. The vehicle body front structure according to claim 6, wherein
    the front side frame is reinforced by a gusset, and
    the front leg portion is connected to the region of the front side frame reinforced by the gusset.

8. The vehicle body front structure according to claim 1, wherein a center in the vehicle width direction of the impact absorbing portion is located on an inner side in the vehicle width direction relative to a center in the vehicle width direction of a front end of the arm portion.

9. The vehicle body front structure according to claim 1, wherein the impact absorbing portion takes on a cylindrical shape and includes a rib inside.

10. The vehicle body front structure according to claim 1, wherein the arm portion is curved from a front end to a rear end of the arm portion.

* * * * *